Oct. 18, 1966   T. W. DUTTON   3,279,093
VEHICLE DEWATERING UNIT FOR AUTOMATIC CAR WASH SYSTEMS
Filed April 30, 1964   8 Sheets-Sheet 6

INVENTOR
*Thomas Wayne Dutton*

BY *Bacon & Thomas*

ATTORNEYS

Oct. 18, 1966 T. W. DUTTON 3,279,093
VEHICLE DEWATERING UNIT FOR AUTOMATIC CAR WASH SYSTEMS
Filed April 30, 1964 8 Sheets-Sheet 7

INVENTOR
Thomas Wayne Dutton
BY Bacon & Thomas
ATTORNEYS

United States Patent Office 3,279,093
Patented Oct. 18, 1966

3,279,093
VEHICLE DEWATERING UNIT FOR AUTOMATIC CAR WASH SYSTEMS
Thomas Wayne Dutton, Mansfield, Ohio, assignor to Dujoy, Inc., Mansfield, Ohio, a corporation of Ohio
Filed Apr. 30, 1964, Ser. No. 363,808
12 Claims. (Cl. 34—229)

This invention relates to the drying of wet automobile body surfaces after they have been washed and rinsed in a car wash system or similar operation. One of the objects of this invention is to direct a high velocity low volume flow of air against the wet surface to dry it by peeling or stripping the film of water off the automobile body surface.

The invention, in a representative embodiment, is a completely automated device, but the basic principles of the invention can also be embodied in a manually operated unit. I have found that, contrary to the claims of manufacturers of automobile drier units, large volumes of air are not required to dry the automobile surface. I have found that a small volume of air effectively directed with a nozzle having a longitudinal slotted opening designed to produce high exit velocities, e.g., in the range of about 130–250 ft./sec., blasts the water from a wetted surface if held in close proximity and at the proper angle to the surface to be dried.

It is another object of this invention to reduce the amount of hand labor required to dry the automobile body surface. With the presently available equipment much hand labor is required to dry the car, because such equipment, which in general, utilizes a central blower and ductwork system, does not effectively remove the water from the surface. These machines cannot develop sufficient nozzle velocity to achieve the result of stripping the water off the automobile surface.

The apparatus of the present invention provides high nozzle exit velocities and also provides a means for bringing the nozzles up to the wetted automobile surfaces in the proper direction to maximize the effect of the high velocity from the nozzle slot.

It is another object of this invention to provide a uniformity of velocity distribution across the nozzle slot to dry the automobile body surface evenly and with a minimum of streaking. The invention accomplished this function by means of the use of a plurality of small volume, high pressure fans arranged side by side with high velocity slotted discharge nozzles either directly connected to the discharge end of said fans, or combined with them in a common integrally designed fan housing.

It is another object of this invention to reduce the amount or volume of air handled by drying units to an absolute minimum. The use of high exit velocity from a fan discharge nozzle slot in conjunction with a means of positioning the nozzle in close proximity to the automobile body surface in proper direction eliminates the end for the excessive volumes of air used in other drying systems.

Another object of the invention is to reduce the amount of power required to operate a car wash drier unit. By the use of a means of positioning the high velocity slotted discharge nozzle in close proximity to the automobile body surface I am able to obtain a very dry surface with a reduction of approximately 80% of the power required by other dryer units. I obtain these results by the elimination of ducts and the friction losses in these air handling systems and ducts and by converting fan total pressure capacity into velocity pressure at the nozzle resulting in velocities of e.g., 200–250 ft. per sec. For presently available ductwork units to achieve these velocities requires blower drive motors with capacities up to 150 H.P. My system can be successfully operated with a plurality of small volume, high pressure fans totaling only 20 H.P.

Another object of the invention is to eliminate the bulky and complex ductwork necessary with present systems.

It is another object of this invention to achieve low noise levels without the use of acoustical materials in the construction of the aforementioned fan and nozzle combination or integral fan nozzle design. Highly efficient axial flow fans with close tip clearances and incorporating a design which features the motor mounted within the fan housing in the air stream combined with efficiently designed nozzles whose converging angles are established to develop uniformity of velocity distribution achieve sound power levels which are substantially less than those of the high horsepower and high rotary speed dryer blowers available at this time.

It is another object of this invention to reduce the amount of hand labor required in the final drying operation of car wash systems. It is not possible to entirely eliminate hand labor because of the necessity to wipe and polish glass surfaces in the windows and to remove all traces of water on painted or chrome surfaces. To this end the users of the currently available systems must employ large numbers of laborers who use towels for the purpose of completing the drying operation. In the use of my invention I have found that I can obtain a completely dry car with only two hand laborers on final cleanup with my automatically controlled machine and with three laborers with my manually operated machine, one of whom operates the positioning device which provides an important function of my vehicle dewatering machine.

It is one of the objects of my invention to improve the drying qualities of dewatering devices to accommodate the wide variations in automobile sizes and body styles. My invention makes it possible to position and locate the high velocity discharge fan nozzles in close proximity to the smallest of compact cars, as well as to the largest and widest of luxury automobiles. I have designed this positioning feature in such a manner that it can be operated as a completely automatic device or as a manually operated device, controlled by an operator who is positioned adjacent to the dewatering unit for the purpose of observing the contours and size of the car and to adjust the nozzle fan position to close proximity to the wet surface, following the vehicle as it advances through the dewatering unit.

Finally, it is an object of my invention to provide a low cost and relatively simple dewatering device which will be inexpensive to manufacture and which results in cost savings in terms of both horsepower and reduced hand labor for the operator.

The construction and operation of my invention will be understood from the following detailed description of the arbor mounting and structure, the fan nozzle design and the positioning means, taken in conjunction with the accompanying drawings wherein:

FIGURE 1 is a side elevational view, partly in section, of the automated vehicle drying apparatus of the invention;

Figure 2:
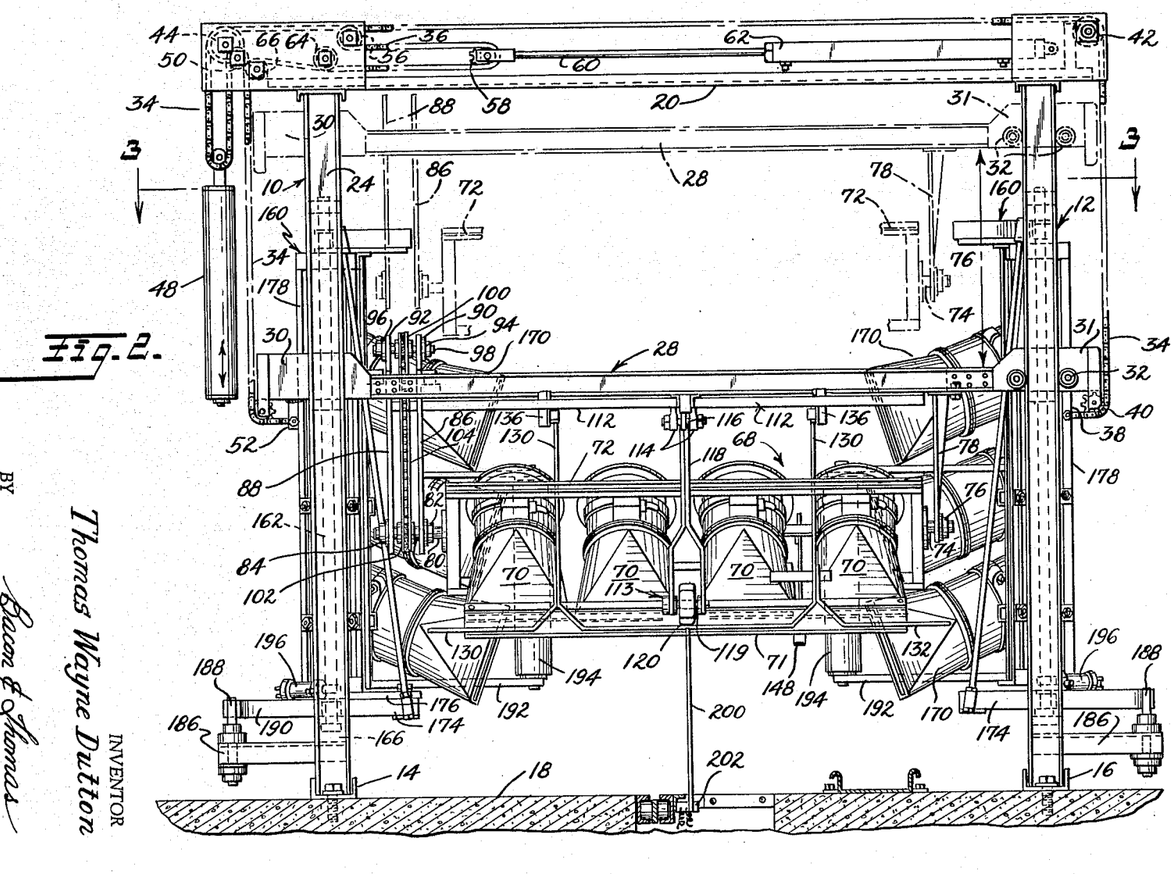
FIGURE 2 is a front elevational view, partly in section, of the apparatus of FIGURE 1 as viewed from the right thereof.
Figure 3:
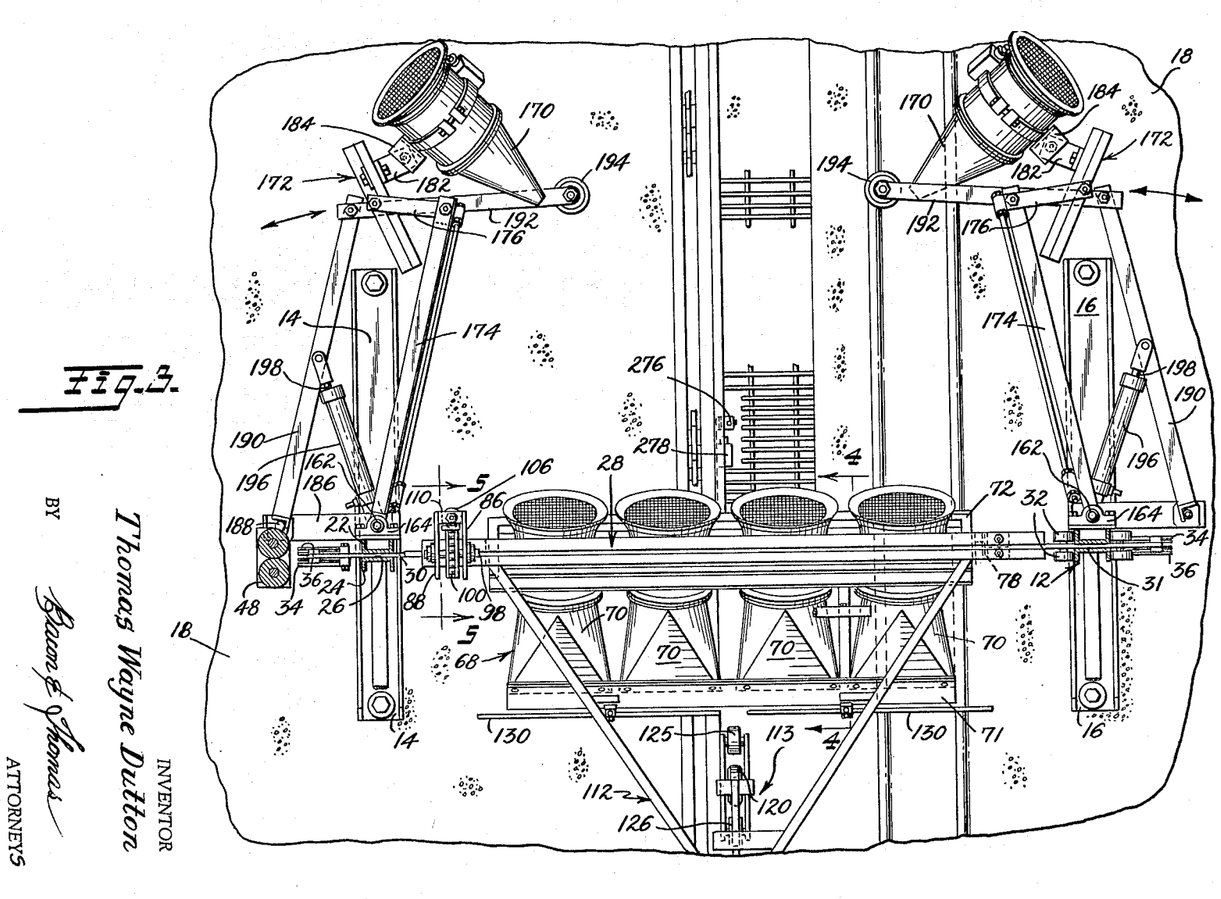
FIGURE 3 is a top plan view, partly in section, of the vehicle drying apparatus taken on line 3—3 of FIGURE 2.

The mounting arrangement of my device, as best seen in FIGURES 1–3, comprises two vertical members 10 and 12 which are welded or suitably fastened to base plates 14 and 16 which are fastened to the floor or foundation 18. The vertical members 10 and 12, one on the left side, one on the right, are joined together at the top by a cross member 20 of sufficient size and rigidity as to hold them parallel and in proper alignment. This cross member 20 is positioned approximately 10 ft. from the floor. The upright vertical members 10 and 12 are each made of two channels 22 and 24 (FIGURE 3), these channels being positioned adjacent to each other in such a manner that a slot 26 (FIGURE 1) is created between the two halves of each upright.

A second cross member or arbor 28 is placed so that its ends 30 and 31 ride in the slots 26 in the right and left-hand uprights. The ends 30 and 31 of the arbor 28 are designed to make it possible for them to be positioned in the slots in the right-hand and left-hand upright members. The arbor 28 is then capable of being moved vertically up or down in the slots of the upright members 10 and 12. Rollers 32 on the end 31 keep the arbor 28 properly positioned.

The outer ends 30 and 31 of the movable arbor 28 are attached to a pair of roller chains 34 and 36. The arrangement of the chains 34 and 36 is best seen from FIGURES 2 and 8. The chain 34 is attached to a depending lug 38 of the end 31, passes around one of a pair of sprockets 40 which are also attached to the arbor end 31, and then around one of a pair of sprockets 42, which are rotatably mounted on a shaft secured to one end of the fixed cross member 20. Chain 34 then passes to the other side of the cross member 20 around a rotatable sprocket 44, is looped around a sprocket 46 attached to a counterweight 48, around a further sprocket 50 and downward to the other end 30 of the arbor 28 where it is secured to depending lug 52. The weight of the arbor and fan assembly which it carries is slightly in excess of that of the counterweight 48 and force of gravity, therefore, normally causes the arbor 28 and fan assembly to be in its lowermost position as shown, for example, in FIGURE 2. Suitable stops (not shown) prevent it from further descent. The lower position sets the fan nozzles at a position to dry the lowest upper surface of a vehicle to be dried.

Figures 8, 9:
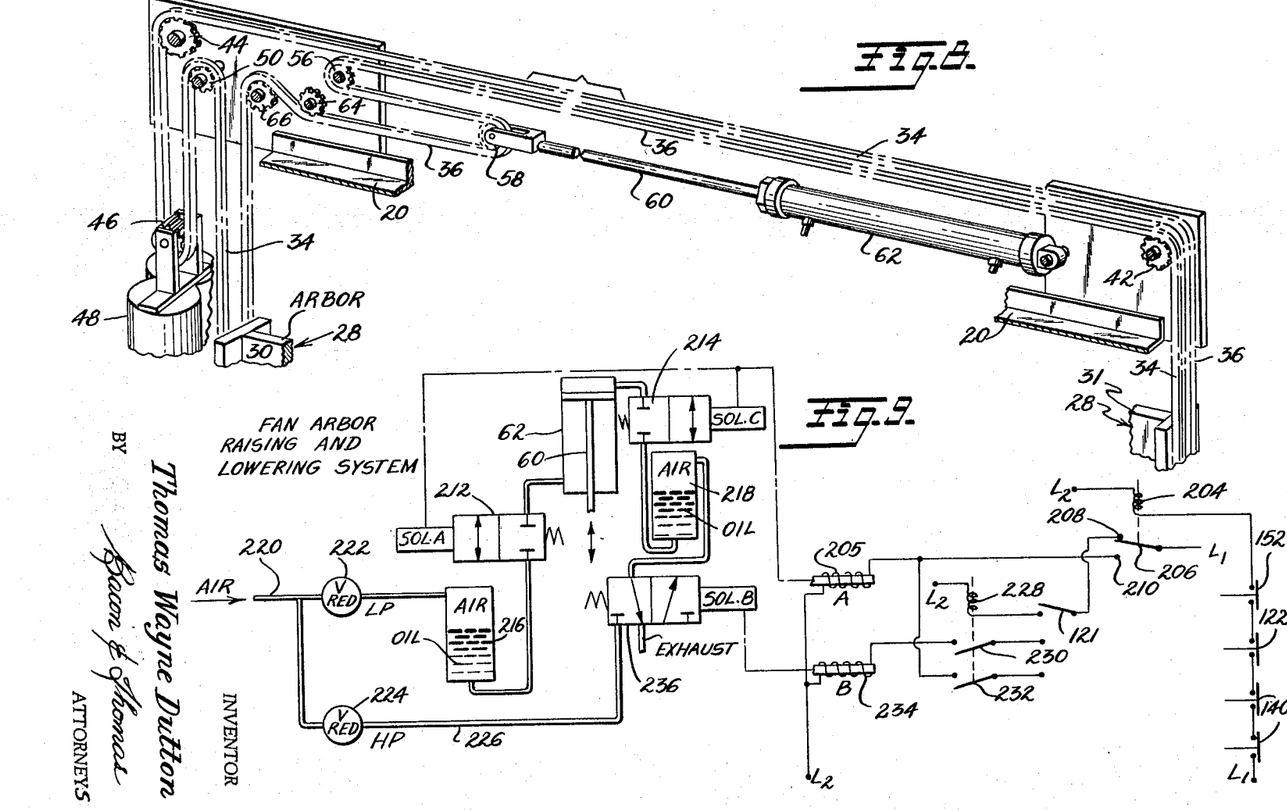
FIGURE 8 is a diagrammatic fragmentary perspective view showing the arrangement of the components for raising and lowering the fan arbor.
FIGURE 9 is a diagrammatic view of the hydraulic and wiring system for raising and lowering the fan arbor in response to signals from the sensing means.

The second chain 36 is similarly attached at one end to the end 31 of the movable arbor 28, passes around one of the sprockets 42 at the right end of the fixed cross member 20, around a rotatable sprocket 56 at the other end of member 20, and is looped around a sprocket 58 carried by the end of movable piston rod 60 of a hydraulic cylinder 62. The chain 36 then passes around sprockets 64 and 66 and is attached to the end 30 of arbor 28 in the manner previously described. The movement of the piston rod 60 in and out of the hydraulic cylinder 62 therefore controls the vertical movement of the arbor 28 whereby it can be raised or lowered by control means which will be described below in connection with FIGURE 9.

Suspended beneath the movable arbor 28 is a fan assembly generally designated as 68 (FIGURE 2). The fan assembly 68 comprises four blower units 70 in the embodiment shown. A greater or smaller number of blower units may be employed depending upon their size and capacity. The blower units 70, as shown, are of the axial flow type. However, it would be possible to use units of design or combination of axial and centrifugal units. The discharge nozzles for the arbor blower units are designed to produce exit velocities of about 200–250 ft. per sec. The side blowers, to be described later on, may be of a lower velocity, e.g., from about 130–200 ft. per sec.

The axial flow units shown in the drawings utilize a cylindrical fan housing in which the air flow is parallel to the fan axis. Single or two-stage units are obtainable, such unit employing either one or two fan impellers with the electric motor drive mounted within the cylindrical fan housing in the air stream. The fan impellers are preferably mounted directly on the motor shaft. Air straightener fins to recover rotative energy may be employed behind the fan impeller or between impellers in the case of a two-stage fan. The intake is provided with a screen cover for maximum safety. The electric leads from the fan units 70 are suitably connected to detachable, flexible electrical connectors. The proportions of the discharge nozzles are carefully designed to achieve a uniformity of velocity distribution across the nozzle slot. The nozzle slot of each fan unit is preferably designed to develop an exit velocity of 150–200 or 200–250 ft. per sec. depending upon where the fan unit is employed. The proportions and design of the blower nozzles results in low noise and uniform velocity distribution. In the units shown, the nozzles of the blowers 70 are provided with a flexible deflector 71, which extends across the nozzles of all four units.

The fan units 70, of the self-contained motor and nozzle structure, create high nozzle velocities with minimum power input. The motor of each blower unit 70, for example, may develop about 2¾ brake horsepower with an input of about 2½ kilowatts.

The blower units 70 are adjustably mounted within a rectangular frame 72. The frame 72 is provided at its right end (FIGURE 2) with a shaft 74, which is rotatable within a bearing 76 carried by a hanger 78, which is fixed to the arbor 28. The left end of the frame 72 is provided with a shaft 80 rotatable within a pair of bearing members 82 and 84 carried by hanger members 86 and 88 which are attached to arbor 28 and are provided with upper extensions 90 and 92 which, in turn, carry a pair of bearings 94 and 96. The upper bearings 94 and 96 are provided with a shaft 98 which carries a sprocket wheel 100. The shaft 80 also carries a sprocket wheel 102 between the bearings 82 and 84. A roller chain 104 connects sprockets 100 and 102. The sprocket wheel and roller chain arrangement are utilized to control the rotation of the frame 72 about a horizontal axis passing through the shafts 74 and 80 and, accordingly, the inclination of the nozzles of the blower units 70 with respect to the surface of a vehicle to be dried. As will be seen from FIGURE 5, the sprocket chain 104 carries a hydraulic cylinder 106 having a piston rod 108 which is fixed at its top end to bracket 110 and at its lower end to bracket 111, both brackets extending between hangers 86 and 88 attached to arbor 28. The operation of this control means will be described below in connection with FIGURE 10.

Centrally of the vertically movable arbor 28 is a forwardly extending feeler support frame 112 (FIGURE 1), which carries feeler means 113 for sensing the position and angle of the surface to be dried for automatic control of the raising and lowering of the arbor 28 and for control of the degree of inclination of the fan nozzles with respect to the surface to be dried. The apex of the frame 112 carries lugs 114 which extend downwardly and carry a shaft 116 that provides a pivotal connection for a crank arm 118. The lower end of the arm 118 is bifurcated and carries a shaft 119 on which a sensing wheel 120 is rotatably mounted. The horizontal portion of the arm 118 passes between a pair of micro-switches 121 and 122 (FIGURE 7) carried by a bracket 123 which also depends from support member 112. The micro-switches 121 and 122 are in the control circuit for raising and lowering the arbor 28 as shown in FIGURE 9. This circuit will be described in connection with the operation of the device. Note that the arm 118 (FIGURE 7) normally closes the switch 121 by force of gravity when there is no engagement of sensing wheel 120 to raise the arm 118. A spring 124 counterbalances part of the weight of the arm 118 and wheel assembly.

Arm 118 also carries a pair of sensing wheels 125 and 126, which are mounted on opposite ends of member 128, the angular position of which determines the position of the movable arm of a variable resistor forming one of the legs of an electrical bridge network which controls operation of a servo-mechanism for tilting the frame 72 carrying the fan units 70 to thereby control the angle of inclination of the fan nozzles. This will be further described below in connection with FIGURE 10.

Figures 6, 7:
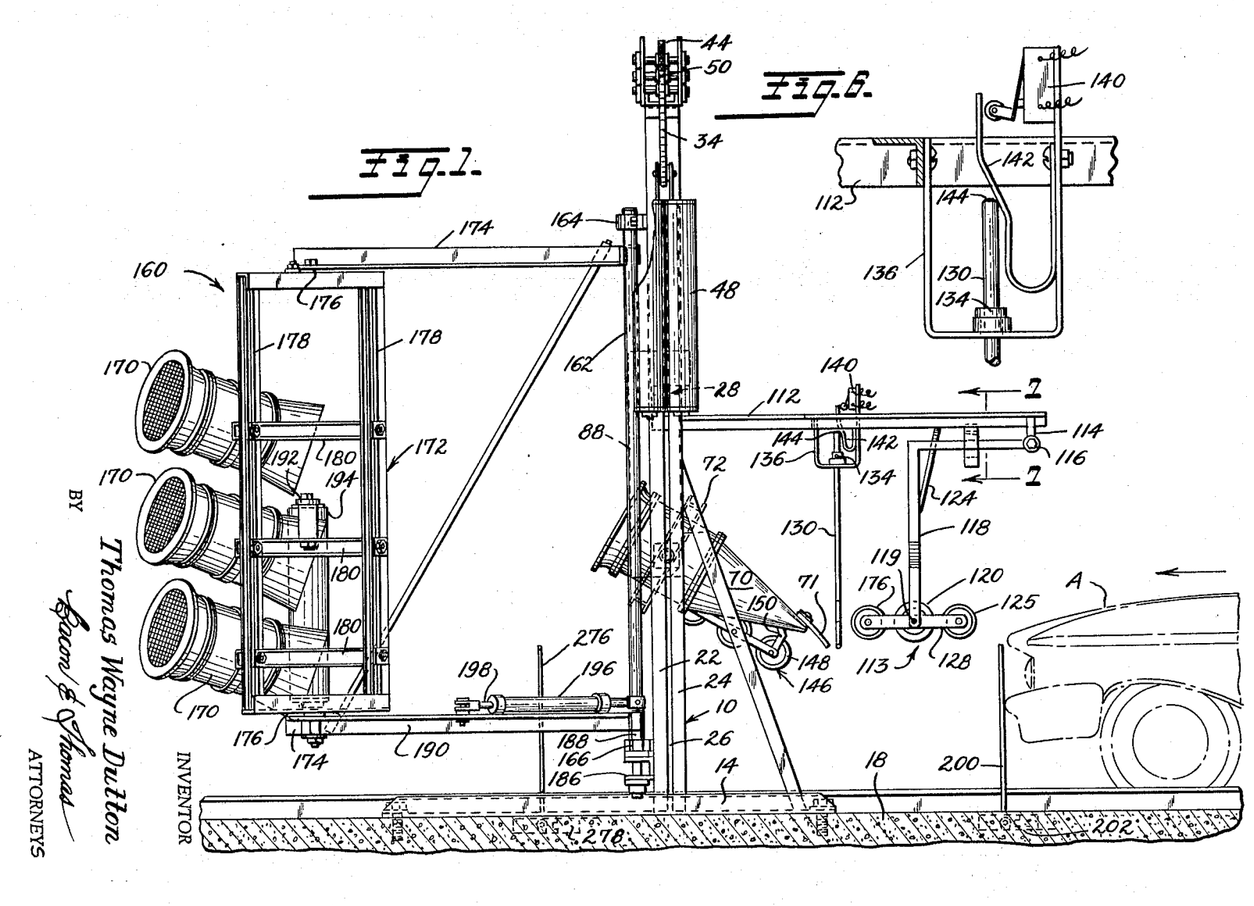
FIGURE 6 is an enlarged fragmentary elevational view showing an actuator and micro-switch associated with one of a pair of transverse feeler rods.

Support frame 112 additionally carries a pair of feeler rods 130 and 132, the lower ends of which extend in horizontal directions as shown in FIGURE 2. The purpose of these feeler rods is to detect irregular objects of the automobile or other vehicle to be dried, such as radio antennae, rear view mirrors, spotlights, etc. so as to cause the arbor unit to move upwardly so as to clear these obstacles. FIGURE 6 shows the top structure of one of the feeler rods 130. The other is identical in structure. Rod 130 is pivotally supported as at 134 in an opening in depending bracket 136 attached to angle 138 which is welded or otherwise fixed to one member of the support frame 112. Bracket 136 is provided with a micro-switch 140 actuated by a leaf spring 142, which, in turn, is actuated by the upper end 144 of the feeler rod 130 when the lower end of such rod engages an obstacle on the vehicle. The micro-switch 140 is in the arbor raising control circuit shown in FIGURE 9.

Figures 4, 5, 7:
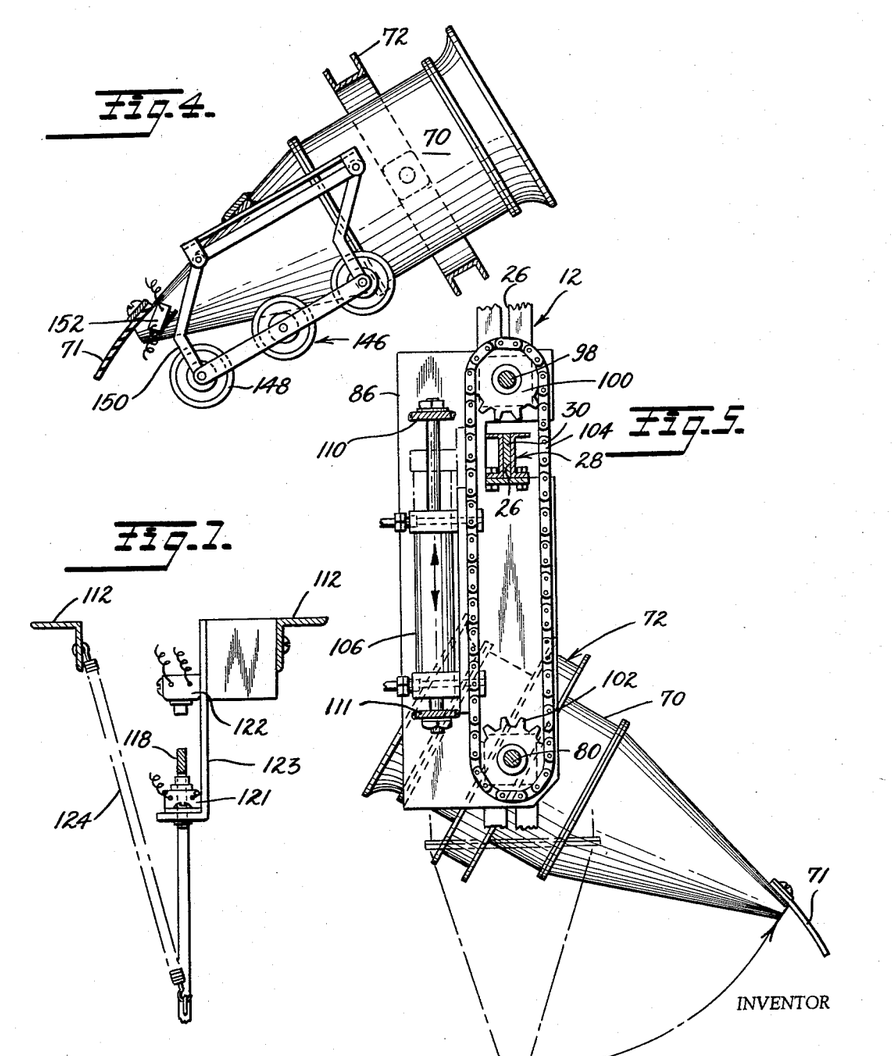
FIGURE 4 is an enlarged fragmentary vertical sectional view showing feeler rollers assembled between the fan arbor nozzles for sensing the position of said nozzles with respect to the upper surfaces of the vehicle, taken on the line 4—4 of FIGURE 3.
FIGURE 5 is an enlarged fragmentary vertical sectional view showing mechanism for tilting the fan assembly to direct the nozzles at the proper angle with respect to the surface to be dried, taken on line 5—5 of FIGURE 3.
FIGURE 7 is an enlarged fragmentary vertical sectional view of a preliminary sensing member and the micro-switches associated therewith, taken on the line 7—7 of FIGURE 1.

Disposed centrally of the middle fan units 70 is a set of sensing wheels generally designated at 146. The mounting of these wheels is best shown in FIGURE 4. Three wheels are shown, the lower wheel 148 being the one which normally contacts the automobile surface as the automobile is passed through the drying device. A bracket arrangement for supporting these wheels includes an arm 150 which passes below a micro-switch 152 which is in the control circuit for raising or lowering the arbor unit. The fan units 70 are shown to be inclined at the proper angle for drying a horizontal upper surface of the vehicle.

Side fan units generally designated at 160 (FIGURES 1 and 3) are disposed on each side of the path of travel of the vehicles. Since these are identical, only one will be described. A shaft 162 is disposed in top and bottom bearing members 164 and 166 attached to the vertical upright members 10 and 12. Each side unit 160, as shown, comprises three fans 170, which are mounted on a framework 172 carried by top and bottom members 174, the inner ends of which are rotatably attached to shaft 162 so that the unit can swing toward and away from the path of the vehicle. The frame 172 is attached to members 174 by top and bottom arms 176 and is adjustable about a vertical axis with respect to those arms. It will further be noted that the frame 172 comprises vertical slotted members 178 (FIGURE 1) and that the fans 170 are attached to cross members 180 which are vertically adjustable to vertically adjust fans 170. Arms 182 (FIGURE 3), which are adjustable around a horizontal axis, attach fan brackets 184 to the cross members 180. Brackets 184 are also adjustable about a vertical axis with respect to arms 182. It will be seen that this arrangement permits wide adjustment of the angle of the nozzles of the fans 170 with respect to the side surface of the vehicle to be dried.

Additionally, means are provided for holding the side fan units 160 yieldably inwardly toward the path of the vehicle against an air cushion. This means includes a member 186 attached to the bottom of vertical frame 26 below bearing 166. The outwardly extending end of member 186 carries a pivot pin 188 on which a member 190 is rotatably mounted. The other end of member 190 is pivotally attached to a feeler arm 192 which, at its outer end, carries a roller 194 adapted to engage the side of a vehicle. This arm 192 is also attached by a pin to the lower support member 174. A pneumatic spring 196 having a plunger rod 198 pivotally attached to member 190 holds the side assembly inwardly toward the approaching vehicle. The roller 194 engages the sides of an automobile as it passes through the dewatering apparatus and urges the side unit 160 outwardly against the air spring so that proper clearance is provided between the nozzles of the fans 170 and the sides of the automobile. The angle at which the fan nozzles are adjusted is such as to strip the water from the sides of the automobile as it passes through.

Figure 10:
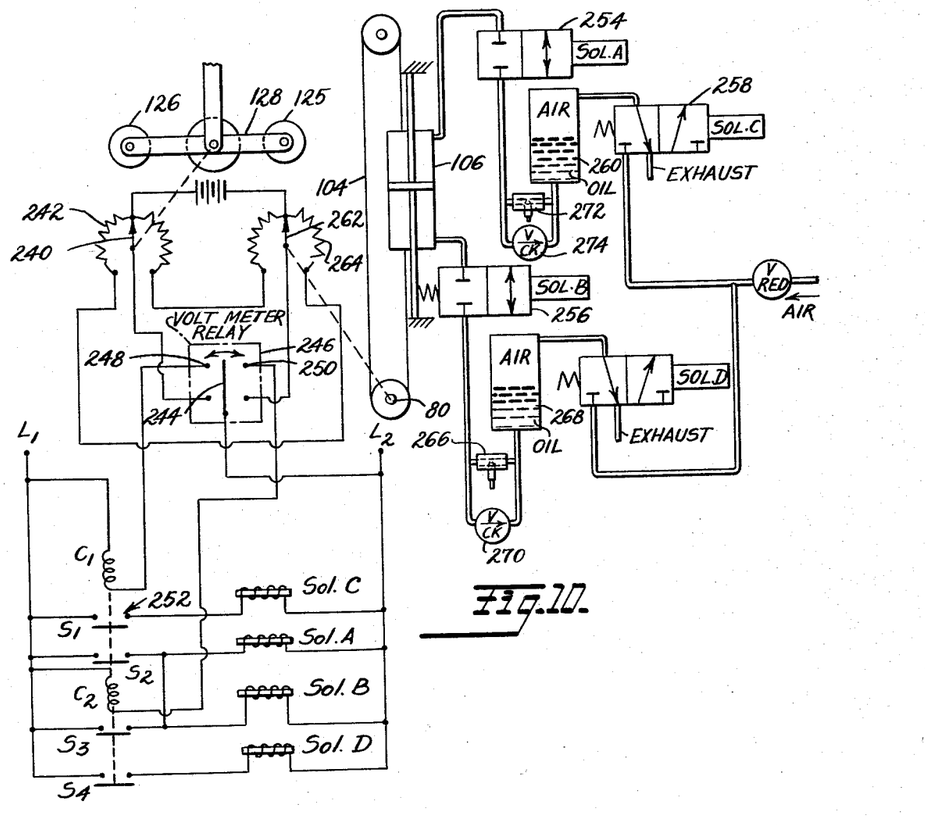
FIGURE 10 is a diagrammatic view of the hydraulic and wiring system for tilting the blower fan assembly in response to signals from one of the sensing means.
Figure 11:
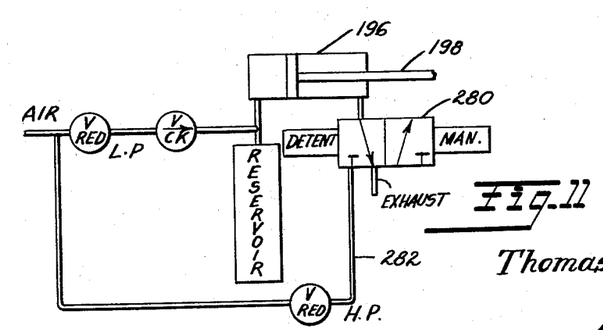
FIGURE 11 is a diagrammatic view of the pneumatic arrangement employed with the side blower fans.
Figure 12:
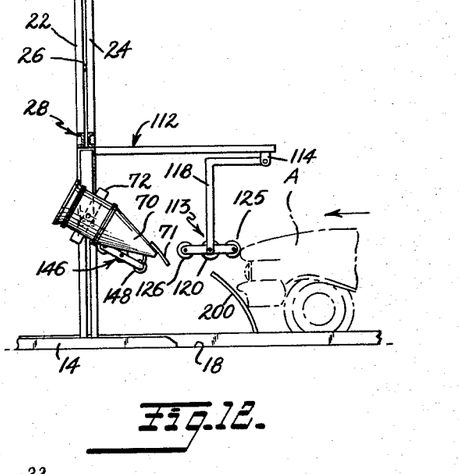
FIGURES 12 through 15 are diagrammatic views illustrating the various positions of the tilting blower fan arbor as a vehicle progresses through the drying apparatus.
Figure 13:
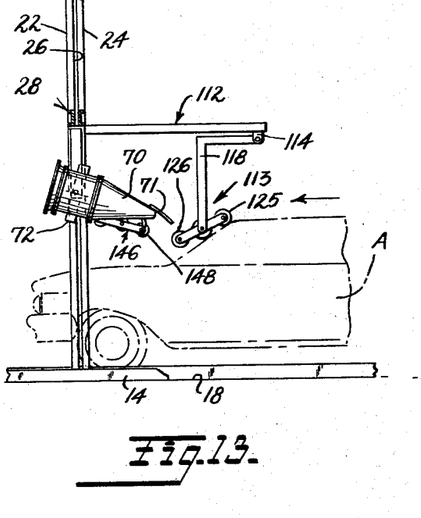
Figure 14:
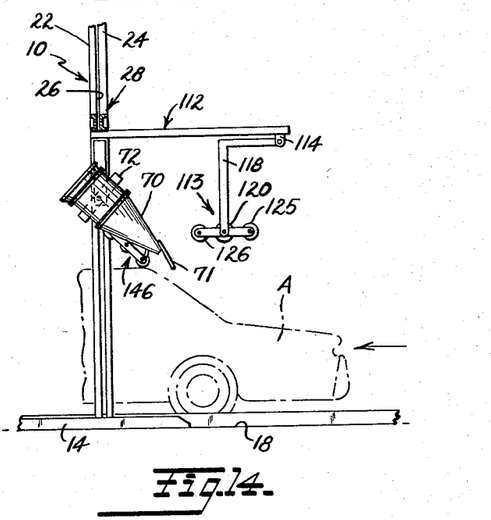
Figure 15:
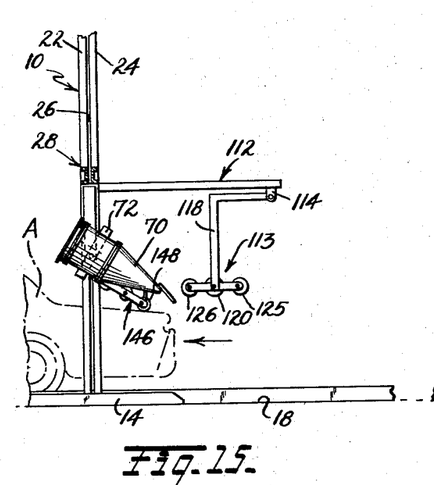

Operation of this automatic embodiment of the invention is as follows, reference being made to FIGURE 1 and to the control diagrams in FIGURES 9, 10 and 11.

An automobile A is towed through the usual car wash installation to the vicinity of the novel dewatering unit. As it approaches this unit (FIGURE 1), it engages a feeler rod 200 which depresses a micro-switch 202 in the electrical circuit (not shown) to the fan units 70 on the overhead arbor 28. These fans then start blowing a sheet of high velocity air toward the approaching automobile.

As the automobile advances, it then engages feeler unit 113 causing arm 118 to contact upper micro-switch 122. As shown in FIGURE 9, this opens the switch 122, causing relay coil 204 to be de-energized. This shifts relay switch 206 from contact 208 to contact 210 thereby energizing coil 205 of solenoids A and C to actuate valves 212 and 214 permitting oil to be forced from reservoir 216 into the lower chamber of hydraulic cylinder 62 and oil to be drained from the upper chamber into reservoir 218. The piston rod 60 is thereby retracted in the cylinder and, as shown in FIGURE 8, this causes the chain 36 to raise the arbor 28. The actuating system here is a combined pneumatic-hydraulic system, air being supplied from a suitable source through line 220 and reducing valve 222. The reducing valve 222 reduces the air pressure to a lower value than reducing valve 224 in branch line 226. Thus, the pressure reduction by valve 222 may be to about 60 pounds per square inch, whereas the pressure reduction in line 226 by valve 224 may be to about 80 pounds per square inch. After the fan arbor has been raised so that sensing wheel 120 no longer pushes the arm 118 against microswitch 122, this switch then closes, the circuit to relay coil 204 is closed and the relay switch 206 is raised so as to make contact 208. This makes it possible for the actuation of switch 121 by arm 118 to energize relay coil 228 to close relay switches 230 and 232. When these switches are closed solenoid coils 205 and 234 are both energized, thereby actuating valves 212, 214 and 236. Since the pressure in the upper chamber of cylinder 62 is now higher than in the lower chamber, the piston rod 60 is forced down so as to lower the arbor 28. It will be understood that where wheel 120 is passing over a flat surface, the arm 118 will be positioned somewhere between micro-switches 121 and 122 (FIGURE 7) and there will be no movement of the arbor 28.

As the automobile advances, the sensing means 113 passes over the hood and the forward portion of the automobile then comes within the area of the lower horizontal ends of the sensing rods 130. If these rods strike any irregular objects, such as antennae, hood ornaments or the like, the rod 130 will cause micro-switch 140 to open (see FIGURES 6 and 9). Opening of this micro-switch then causes the same sequence of operation as just described to cause the arbor 28 to be raised to clear the object in question. Upon clearance of such object, micro-switch 140 is then closed and the arbor descends until sensing wheel 120 makes contact with the upper surface which is then beneath it.

Further progress of the automobile brings the hood under the nozzle of the fan units 70. The wheel 148 will ride upon the surface of the automobile and if, for any reason, the arbor is lowered past a desired limit, the arm 150 (FIGURE 4) will make contact with micro-switch 152 thereby opening this switch (FIGURE 9) causing the control circuit and valve arrangement to raise the arbor as described above. After clearance of the difficulty, the arbor will descend to the proper position above the surface being dried.

Up to this point the function of the additional sensing wheels 126 and 128 of the unit 113 have not been described in detail. Referring now to FIGURES 10 and 12-15, it will be seen that as the unit 113 approaches an inclined surface, such as the windshield of the automobile, the sensing wheels 125 and 126 will cause connecting member 128 to be rotated. Rotation of this member causes contact arm 240 of a potentiometer 242 to rotate, thereby unbalancing one leg of a bridge circuit as shown in FIGURE 10. This will cause switch element 244 of volt meter relay 246 to make contact with one of the terminals 248 and 250, depending upon the direction of rotation of the arm 128. Assuming that contact is made with terminal 248, the coil $C_1$ of a relay 252 will be energized, causing switches $S_1$ and $S_2$ to close, thereby energizing the coils of solenoids A, B and C. These solenoids operate valves 254, 256 and 258. The actuation of these valves will cause oil to be forced from chamber 260 into the upper chamber of hydraulic cylinder 106. Since the piston rod of this cylinder is fixed, the cylinder will, therefore, cause movement of the chain 104 to rotate the shaft 80, which tilts the frame 72 carrying the fan units 70. The shaft 80 is mechanically connected with contact arm 262 of potentiometer 264 which forms the other leg of the bridge circuit. When this contact arm reaches the same position as contact arm 240, the bridge circuit will then be balanced, relay switch 244 will assume its neutral position and no further movement of the cylinder 106 will occur.

It will be noted that as the cylinder 106 is raised during the above-described operation, the exhaust oil will pass through an adjustable orifice 266 into reservoir 268. Check valve 270 permits unrestricted flow of the oil in the other direction during operation to lower cylinder 106. A similar orifice 272 and check valve 274 control the flow of oil in the other direction. By proper adjustment of the orifice 266 and 272 a time delay is effected between the movement of the sensing member 128 and the tilting of the fans by the hydraulic means. This time delay permits the nozzle of the fan units 70 to approach the inclined surface at the proper time after the sensing means have passed thereover.

FIGURES 12-15 illustrate the relative angle of the fan units 70 with respect to the surfaces encountered.

As the vehicle passes beneath the arbor 28, the front end will trip a feeler 276 closing a micro-switch 278 in the electrical circuit to the side fan units 170. These units will start to blow air inwardly toward the path of the automobile. As the automobile proceeds further between the side units, it will strike rollers 194 and force the units out against the air spring provided by the cylinder 196. As will be seen from FIGURE 11, a reservoir of air is maintained behind the plunger of this cylinder, permitting resilient urging of the side units toward the sides of the vehicle. In the event that it is desired to retract the side units away from the vehicle for any reason, a manual control is provided. This manual control comprises valve 280 which can be depressed to permit high pressure air from line 282 into the other side of the cylinder. Piston rod 198 then retracts, causing the unit to swing out.

The adjustable features of the fan units 170 with respect to their supporting means has already been discussed. As shown in FIGURE 1, the fan units 170 are tilted in and down with respect to the side of the vehicle being dewatered.

As the autmobile clears the dewatering device, the micro-switches 202 and 278 are opened, thereby de-energizing the fan circuits. The various sensing wheels and rollers are of resilient material which will not scar the vehicle surface and the pressure exerted by these means is quite small, thereby providing a minimum of streaking of the automobile surface.

Figure 16:
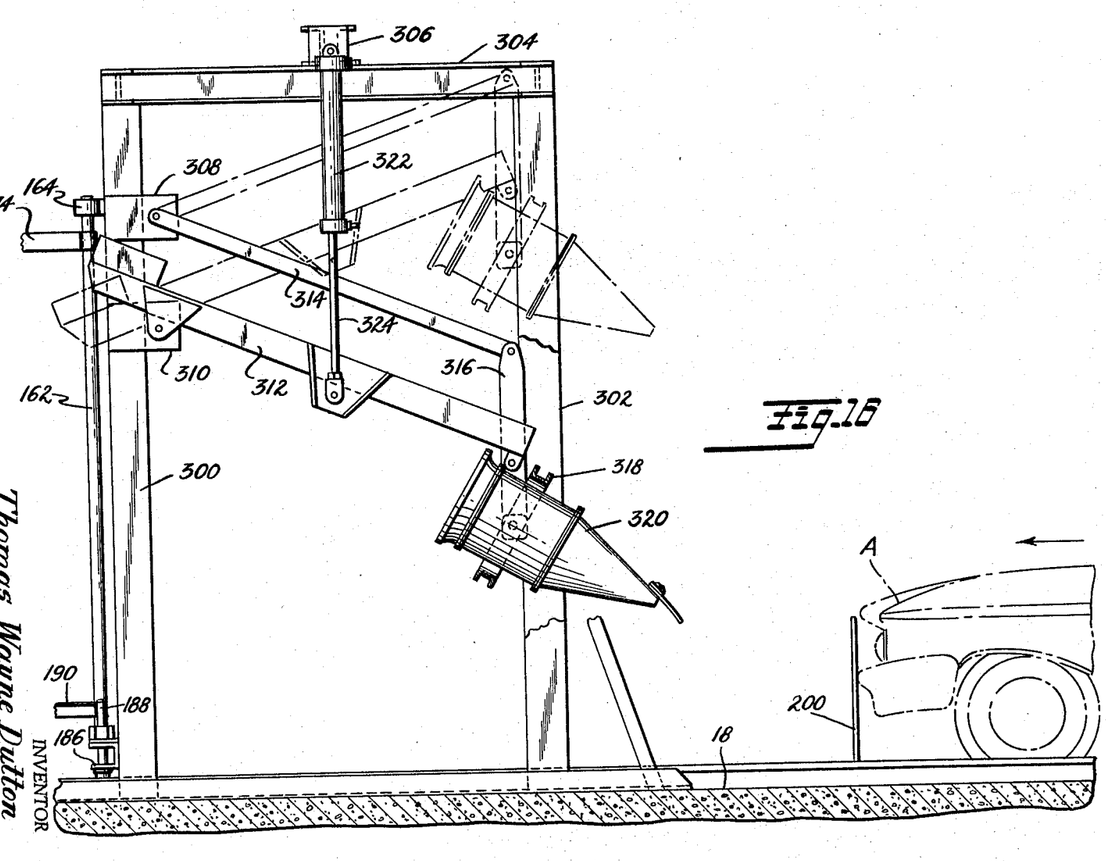
FIGURE 16 is a fragmentary side elevational view of a modified form of the present invention for raising and lowering the blower fan arbor in response to manual control.

In FIGURE 16 a modified structure for the drying of the upper surfaces of the vehicle is illustrated. In this structure a pair of vertical standards 300 and 302 on each side of the path of travel of the vehicle are provided with a top connecting member 304, which supports a transverse overhead beam 306 over the path of travel of the vehicle. Brackets 308 and 310 provide connecting points for pantograph structure including arms 312 and 314. The outer arm 316 of the pantograph supports frame 318 which carries a plurality of fan units 320. These fan units 320 and the frame structure 318 are similar to the fan units 70 and frame structure 72 previously described. It will be understood that there is a similar pantograph structure on the other side of the path of travel of the vehicle which supports the other end of frame 318.

The frame 318 and the fan units 320 are raised and lowered by hydraulic means including cylinder 322 and piston rod 324, the bottom end of which is pivotally attached to the lower arm 312, as shown. The cylinder 322 is supported from one end of the cross beam 306. A similar cylinder would be provided at the other end of cross member 306. The hydraulic means may be actuated either in response to manual signals in a manner which will be apparent to those skilled in the art or in response to signals from sensing means as previously described with the automatic unit of FIGURES 1-15. It will be further understood that the apparatus previously described in connection with FIGURES 1-15 may be operated in response to manual signals, rather than to the sensing means described. For example, manually operable switches may be substituted for the switches actuated by the feeler means.

Although the invention has been described and illustrated in detail, it should be clear that such structure is representative only and that many modifications could be made without departing from the spirit and scope of the invention as defined in the following claims.

I claim:
1. In a vehicle dewatering apparatus having a path of travel along which vehicles are adapted to move, a fixed frame having a vertical member on each side of the said path of travel, a movable arbor suspended between said vertical members across the path of travel of said vehicle, a plurality of low volume fans carried by said arbor, said fans having self-contained power means and having nozzles for providing a high velocity sheet of air, and means for vertically moving said movable arbor to position said nozzles at different selected positions so as to follow the contour of the vehicle as it passes through the apparatus beneath said movable arbor.

2. The apparatus of claim 1 including feeler means depending from said movable arbor for following the contour of said vehicle, and means for moving said arbor in response to signals from said feeler means.

3. The apparatus of claim 2 wherein the feeler means includes an arm having a depending wheel positioned centrally of the path of travel of the vehicle, the apparatus includes a pair of spaced switches of an electrical control circuit disposed for actuation by said arm, one of said switches being actuated by upward movement of said arm upon engagement of said wheel with a vehicle surface, and the other of said switches being actuated by downward movement of said arm by force of gravity, actuation of the first-mentioned switch causing said control circuit to energize means for raising said arbor and actuation of the second-mentioned switch causing said control circuit to energize means for lowering said arbor.

4. The apparatus of claim 1 including manually operable control means for moving said arbor so as to position said fan nozzles at different vertical positions corresponding to the contour of said vehicle during its passage beneath said arbor.

5. The apparatus of claim 1 including means for tilting said fans around a horizontal axis so as to direct said fan nozzles at a selected angle with respect to the surface of the vehicle to be dried.

6. The apparatus of claim 5 including sensing means depending from said movable arbor for sensing the angle of inclination of the surfaces of the vehicle approaching said fan nozzles, and means responsive to said sensing means for tilting said fans around said horizontal axis.

7. In a vehicle dewatering apparatus having a path of travel along which vehicles are adapted to move, a vertically movable arbor disposed across said path of travel, a plurality of low volume fans carried by said arbor, said fans having self-contained power means and having nozzles for providing a high velocity sheet of air, means for automatically lowering said vertically movable arbor to space said fan nozzles at a selected distance from upper surfaces of a vehicle to be dried, and means for automatically raising said movable arbor to cause said fan nozzles to clear obstructions on said upper surfaces of the vehicles as the vehicle passes through said arbor and fans, said last-mentioned means including means for inactivating the means for automatically lowering said arbor until the obstruction has cleared the fan nozzles.

8. The apparatus of claim 7 wherein said fans are attached to a common frame suspended beneath said movable arbor and arranged to rotate about a horizontal axis across said path of travel of the vehicle, and wherein said apparatus includes sensing means depending from said movable arbor forward of the fan nozzles for sensing the angle of inclination of the surfaces of the vehicle approaching said fan nozzles, and means responsive to said sensing means for rotating the fan frame to thereby position the fan nozzles at a selected angle with respect to the surfaces being dried.

9. The apparatus of claim 8 wherein said sensing means includes a member rotatable by contact with the surface of the vehicle to the angle of inclination of such surface, and wherein the apparatus includes servo-mechanism to rotate the fan frame through the same angle as the rotatable member of the sensing means.

10. The apparatus of claim 8 wherein said servo-mechanism contains time delay means to compensate for the distance between the sensing means and the fan nozzles.

11. In a vehicle dewatering apparatus having a path of travel along which vehicles are adapted to move, a fixed frame having a vertical member on each side of the said path of travel, a vertically movable frame extending across said path of travel, pantograph means connected to said vertical members and to said movable frame for supporting said movable frame and for maintaining said movable frame in a vertical plane during movement, power means for raising and lowering said movable frame, and a plurality of low volume fans adjustably mounted on said movable frame, said fans having nozzles for directing a high velocity sheet of air against the surfaces of a vehicle to be dried.

12. The apparatus of claim 11 wherein said movable frame is rotatable about a horizontal axis so as to adjust the angle of inclination of the fan nozzles carried thereby.

References Cited by the Examiner
UNITED STATES PATENTS

| | | | |
|---|---|---|---|
| 2,440,157 | 4/1948 | Rosseau | 34—229 |
| 2,711,592 | 6/1955 | Larson | 34—229 X |
| 2,803,892 | 8/1957 | Hurst | 34—229 |
| 3,085,351 | 4/1963 | Hurst | 34—229 |

JAMES W. WESTHAVER, *Primary Examiner.*